United States Patent
Lee et al.

(10) Patent No.: US 8,234,683 B2
(45) Date of Patent: Jul. 31, 2012

(54) METHOD AND APPARATUS FOR CONTROLLING CHANNEL FOR PROVIDING INTERNET PROTOCOL TELEVISION SERVICE

(75) Inventors: Dai-Boong Lee, Seoul (KR); Hwangjun Song, Pohang-si (KR)

(73) Assignees: Postech Academy-Industry Foundation, Pohang-si (KR); Seoul National University R&DB Foundation, Seoul (KR)

( * ) Notice: Subject to any disclaimer, the term of this patent is extended or adjusted under 35 U.S.C. 154(b) by 512 days.

(21) Appl. No.: 12/489,632

(22) Filed: Jun. 23, 2009

(65) Prior Publication Data

US 2010/0319029 A1 Dec. 16, 2010

(30) Foreign Application Priority Data

Jun. 16, 2009 (KR) ........................ 10-2009-0053619

(51) Int. Cl.
*H04N 7/173* (2006.01)
*H04N 7/16* (2006.01)
*H04N 7/12* (2006.01)

(52) U.S. Cl. ........ 725/116; 725/118; 725/131; 725/146; 725/148; 725/151; 375/240.26

(58) Field of Classification Search .................. 725/114, 725/116, 118, 131, 146, 148, 151; 375/240.26; 370/431
See application file for complete search history.

(56) References Cited

U.S. PATENT DOCUMENTS

| 7,954,132 | B2* | 5/2011 | Song et al. | 725/114 |
| 8,040,438 | B2* | 10/2011 | Kim et al. | 348/731 |
| 2005/0078757 | A1* | 4/2005 | Nohrden | 375/240.28 |
| 2007/0250890 | A1* | 10/2007 | Joshi et al. | 725/120 |
| 2007/0277219 | A1* | 11/2007 | Toebes et al. | 725/139 |
| 2007/0280298 | A1* | 12/2007 | Hearn et al. | 370/498 |
| 2009/0066852 | A1* | 3/2009 | Dai et al. | 348/731 |
| 2010/0111197 | A1* | 5/2010 | Jiang et al. | 375/240.26 |
| 2010/0251296 | A1* | 9/2010 | Kim et al. | 725/38 |

* cited by examiner

*Primary Examiner* — Brian Pendleton
*Assistant Examiner* — Pinkal R Chokshi
(74) *Attorney, Agent, or Firm* — Harness, Dickey & Pierce, PLC

(57) ABSTRACT

A method and apparatus for controlling a channel for providing an IPTV is disclosed, which is capable of improving use efficiency of network resource and reducing a channel zapping time by controlling a channel type of each channel and a bit rate of video data to be transmitted through each channel, the method comprising (a) determining an optimal channel status vector among channel status vectors to indicate channel types of respective channels, wherein the optimal channel status vector enables a minimum cost corresponding to the sum of an average channel zapping time of respective channels and an average distortion value of video data transmitted through the respective channels; and determining an optimal bit rate at the determined optimal channel status vector; and (b) transmitting the video data at the optimal bit rate through the respective channels.

12 Claims, 6 Drawing Sheets

METHOD AND APPARATUS FOR CONTROLLING CHANNEL FOR PROVIDING INTERNET PROTOCOL TELEVISION SERVICE

CROSS REFERENCE TO RELATED APPLICATIONS

This application claims the benefit of the Korean Patent Application No. 10-2009-0053619, filed on Jun. 16, 2009, which is hereby incorporated by reference as if fully set forth herein.

BACKGROUND OF THE INVENTION

1. Field of the Invention

The present invention relates to an IPTV service provision, and more particularly, to a method and apparatus for controlling a channel for providing an IPTV service.

2. Discussion of the Related Art

With the recent development of communication and Internet technologies, a TPS (Triple Play Service) for simultaneously transmitting broadcasting data, telephonic data, and other data via a signal subscriber line has been introduced in the market. There is the increasing demand for the TPS since the TPS provides users with a variety of services in a package through the single subscriber line. Thus, the number of service provision enterprises is also increased rapidly.

A typical example of the TPS is an IPTV (Internet Protocol Television) service. The IPTV service provides users with broadcasting services over a conventional Internet network. In comparison to the conventional broadcasting services, for example, cable-broadcasting service, satellite-broadcasting service, terrestrial-broadcasting service, the IPTV service can use network resources more effectively.

As shown in FIG. 1A, the conventional broadcasting services transmit data of all channels to the users without regard to user's request, thereby causing a waste of broadband. However, as shown in FIG. 1B, according as an IP multicast technology is introduced to the IPTV service, the IPTV service transmits only channel requested by the user. Thus, the IPTV service can overcome the bandwidth problem caused by the insufficient subscriber line.

However, the IPTV service has such a structure that the corresponding channel is transmitted by the user's request. When the user requests the new channel, a delay time (hereinafter, referred to as a channel zapping time) occurs until the new channel selected by the user is outputted to the user terminal.

In order to reduce the channel zapping time, the various channels have to be always provided to the users without regard to the user's request, as shown in the conventional broadcasting services. In this case, a bit rate of each channel has to be maintained at a low level due to limitation of bandwidth, thereby causing an avoidable degradation in quality of received video data.

If the bit rate of each channel is raised to enhance the quality of received video data, the quality may be improved. However, due to the limitation of resources, the number of channels with types to be provided to the users is decreased so that the channel zapping time is increased.

Accordingly, there is an increasing requirement for a method which is capable of maintaining the short channel zapping time and the high video quality in a trade-off relation.

SUMMARY OF THE INVENTION

Accordingly, the present invention is directed to provide a method and apparatus for controlling a channel for providing an IPTV that substantially obviates one or more problems due to limitations and disadvantages of the related art.

An aspect of the present invention is to provide a method and apparatus for controlling a channel for providing an IPTV, which is capable of improving use efficiency of network resource and reducing a channel zapping time by controlling a channel type of each channel and a bit rate of video data to be transmitted through each channel.

Additional features and aspects of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, a method of controlling a channel for providing an IPTV service comprises (a) setting a channel status vector to indicate a channel type of 'M' channels to an initial channel status vector, and calculating a first cost and a first bit rate based on the initial channel status vector, wherein the first cost corresponds to the sum of an average channel zapping time of the respective channels at the initial channel status vector and an average distortion value of video data to be transmitted through the respective channels; (b) changing the initial channel status vector by changing the channel type of at least one channel among the 'M' channels, and calculating a second cost and a second bit rate based on the changed channel status vector, wherein the second cost corresponds to the sum of an average channel zapping time of the respective channels at the changed channel status vector and an average distortion value of video data to be transmitted through each channel; (c) if the second cost is less than the first cost, executing a resetting process by substituting the changed channel status vector for the initial channel status vector; and (d) determining the changed channel status vector and second bit rate as an optimal channel status vector and optimal bit rate if the number of channels with a first type is a predetermined minimum value at the changed channel status vector, and repeating the steps of (a) to (c) if the number of channels with the first type is not the predetermined minimum number at the changed channel status vector.

In another aspect of the present invention, a method of controlling a channel for providing an IPTV service comprises determining first and second reference values by using the number of first type channels among 'M' channels, and determining an intermediate value between the first and second reference values; calculating a maximum value among integers below the intermediate value, and a minimum value among integers above the intermediate value, and determining a bit rate of video data to be transmitted through the respective channels based on the minimum value, the intermediate value, and the maximum value; calculating a cost at each channel status vector determined based on the minimum value, the intermediate value, and the maximum value, wherein the cost corresponds to the sum of an average channel zapping time of the respective channels and an average distortion value of video data to be transmitted through the respective channels; and determining the channel status vector and bit rate for the intermediate value as an optimal channel status vector and optimal bit rate if the cost for the intermediate value is the same as or less than the cost for the minimum value and the cost for the maximum value, and repeating each step after substituting the intermediate value for the first or second reference value if the cost for the minimum value is less than the cost for the maximum value or the cost for the minimum value is the same as or more than the cost for the maximum value.

At this time, the first reference value is the predetermined minimum number of the first type channels, and the second reference value is the predetermined maximum number of the first type channels.

In another aspect of the present invention, a method of controlling a channel for providing an IPTV service comprises (a) determining an optimal channel status vector among channel status vectors to indicate channel types of respective channels, wherein the optimal channel status vector enables a minimum cost corresponding to the sum of an average channel zapping time of respective channels and an average distortion value of video data transmitted through the respective channels; and determining an optimal bit rate at the determined optimal channel status vector; and (b) transmitting the video data at the optimal bit rate through the respective channels.

At this time, the step (a) comprises determining the optimal channel status vector which enables the minimum cost corresponding the sum of the average channel zapping time of respective channels and the average distortion value of video data transmitted through the respective channels, makes a network resource for the first type channel be less than a predetermined bandwidth for the first type channel, and makes a network resource for the second type channel be less than a predetermined bandwidth for the second type channel.

In the channel controlling method, the channel types includes first and second types, wherein the first type transmits the video data to be transmitted through the respective channels to a user terminal without regard to a user's request, and the second type transmits the video data to the user terminal only when there is the user's request.

The average channel zapping time of the respective channels is a value obtained by normalizing a virtual average channel zapping time of the respective channels at the specific channel status vector in a predetermined range. The normalizing process is performed by dividing a difference between the virtual average channel zapping time at the specific channel status vector and the average channel zapping time when the number of the first type channels is at maximum by a difference between the average channel zapping time when the number of the first type channels is at minimum and the average channel zapping time when the number of the first type channels is at maximum.

Also, the virtual average channel zapping time of the respective channels at the specific channel status vector is determined by a channel zapping time for the first type channel, a channel preference for each channel, information about the channel type of each channel, and a channel zapping time for the second type channel.

The virtual average channel zapping time of the respective channel at the specific channel status vector is calculated by $$t_{pro}\left(1 - \sum_{i=1}^{M_{ch}}(1-s_i)p_i(1-p_i)\right) + t_{on}\sum_{i=1}^{M_{ch}}(1-s_i)p_i(1-p_i),$$

wherein $t_{pro}$ is the channel zapping time for the first type channel; $S_i$ is the information for the channel type of the $i^{th}$ channel; $p_i$ is the preference for the $i^{th}$ channel; $t_{on}$ is the channel zapping time for the second type channel; and $M_{ch}$ is the total channel number. At this time, the information about the first type channel has a value of '1', and the information about the second type channel has a value of '0'. Also, the channel zapping time for the first type channel is $$\frac{T_{dec}}{2},$$

and the channel zapping time for the second type channel is $$t_{on} = T_{net} + \frac{T_{dec}}{2},$$

wherein $T_{dec}$ is a time interval of GOP (Group of Picture) of the video data; and $T_{net}$ is the sum of a time period needed to receive the requested channel after transmitting the request for changing the channel, and a time period needed for multicast session join and level processes.

The channel preference is approximated by $$\frac{\sum_{j=1}^{N_{subs}} tw_i^j}{N_{subs} \cdot T_{update}},$$

wherein $N_{subs}$ is the number of subscribers; $T_{update}$ is a fixed time interval; and $tw_i^j$ is a time interval that the $j^{th}$ subscriber has watched the $i^{th}$ channel.

The bit rate is determined by the ratio of a bandwidth allocated to the first type channels to a total number of the first type channels at the specific channel status vector. Also, the average distortion value of the video data to be transmitted through the respective channels is a value obtained by normalizing a virtual average distortion value in a predetermined range when the video data is transmitted at the specific bit rate through the respective channels.

The normalizing process is performed by dividing a difference between the virtual average distortion value when the video data is transmitted at the specific bit rate and the virtual average distortion value when the video data is transmitted at the bit rate calculated under the conditions of the minimum number of the first type channels by a difference between the virtual average distortion value when the video data is transmitted at the bit rate calculated under the conditions of the maximum number of the first type channels and the virtual average distortion value when the video data is transmitted at the bit rate calculated under the conditions of the minimum number of the first type channels.

The virtual average distortion value when transmitting the video data at the specific bit rate is defined by the ratio of a total value of R-D curve calculated by the respective channels and a total channel number 'M'. The R-D curve is approximated by $$a_i\left(\frac{r}{f_i \cdot w_i}\right)^{-b_i},$$

wherein $a_i$ and $b_i$ are distortion model parameters of the $i^{th}$ channel; $f_i$ is the number of frames in the $i^{th}$ channel; $w_i$ is the number of pixels per frame in the $i^{th}$ channel; and r is the specific bit rate.

The IPTV service is provided over WiMAX network.

In another aspect of the present invention, an apparatus of controlling a channel for providing an IPTV service comprises a controller for determining an optimal channel status vector among channel status vectors to indicate channel types of 'M' channels, wherein the optimal channel status vector enables a minimum cost corresponding to the sum of an average channel zapping time of the respective channels and an average distortion value of video data transmitted through the respective channels; and determining an optimal bit rate at the determined optimal channel status vector; and a transmitter for transmitting the video data at the optimal bit rate through the respective channels.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Hereinafter, a method and apparatus for controlling a channel for providing an IPTV service according to the present invention will be described with reference to the accompanying drawings.

Figure 2:
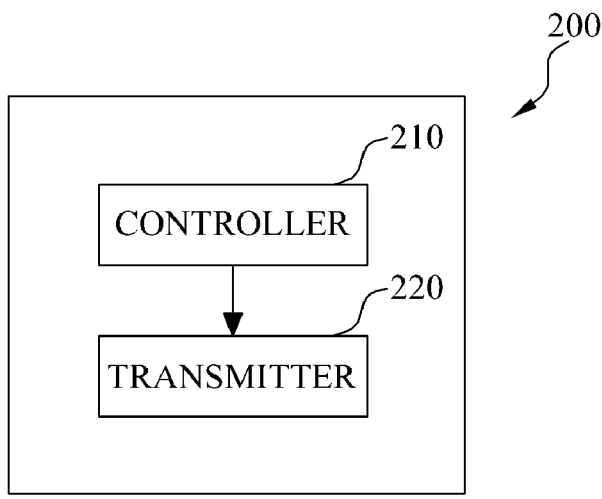
FIG. 2 is a block diagram illustrating a channel controlling apparatus according to one embodiment of the present invention.

FIG. 2 is a block diagram illustrating a channel controlling apparatus for providing an IPTV service according to one embodiment of the present invention.

As shown in FIG. 2, the channel controlling apparatus 200 for providing the IPTV service according to one embodiment of the present invention includes a controller 210 and a transmitter 220.

The controller 210 determines an optimal channel status vector enabling a cost to be at minimum among channel status vectors to indicate channel types of 'M' channels, wherein the cost is defined by the sum of an average channel zapping time of the respective channels and an average distortion value of video data transmitted through the respective channels; and determines an optimal bit rate at the determined optimal channel status vector.

In one embodiment of the present invention, the channel types are classified into a proactive channel (hereinafter, referred to as a 'first type channel') and an on-demand channel (hereinafter, referred to as a 'second type channel'), wherein the first type channel corresponding to the proactive channel indicates that video data to be transmitted through the respective channels is transmitted to a user terminal without regard to the user's request, and the second type channel corresponding to the on-demand channel indicates that video data to be transmitted through the respective channels is transmitted to a user terminal only when there is a user's request.

If a specific channel is set to the first type channel, it enables the decrease of channel zapping time. However, when no one watches the specific channel, it may waste a network bandwidth. In the meantime, if a specific channel is set to the second type channel, it is possible to prevent a waste of network bandwidth, but the channel zapping time may increase.

Figure 3:
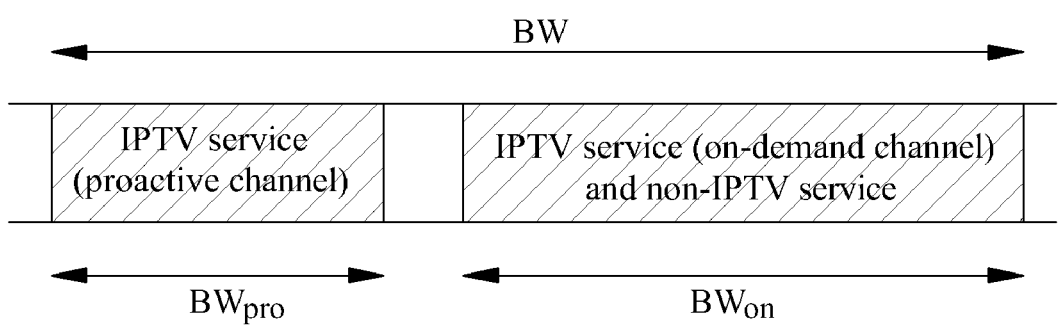
FIG. 3 illustrates a structure of bandwidth for provision of an IPTV service.

Especially, as shown in FIG. 3, supposing that an entire bandwidth is divided into one bandwidth for the first type channel, and another bandwidth for the second type channel and non-IPTV service; and a bit rate of the first type channel is the same as a bit rate of the second type channel. In this case, if increasing the number of first type channels, the channel zapping time is decreased, but the bit rate of channel is lowered due to the limited network bandwidth, thereby causing degradation of video quality.

If increasing the bit rate of channel, the video quality is improved, but the channel zapping time is increased due to the decreased number of first type channels by the limited network bandwidth.

Accordingly, the controller 210 determines the channel status vector and the bit rate of video data, which are capable of decreasing the channel zapping time in the limited network bandwidth and improving the video quality, simultaneously.

At this time, the channel status vector indicates the channel type of each of 'M' channels, as mentioned above. The channel status vector or can be expressed as the following equation 1.

$$\vec{s} = (s_1, s_2, \ldots, s_{M_{ch}})$$ [Equation 1]

In one embodiment of the present invention, channel type information is set to '1' when the $i^{th}$ channel is the first type channel; and channel type information is set to '0' when the $i^{th}$ channel is the second type channel. Thus, when the number of channels is 'M', the channel type information may have two values of '1' and '0', whereby there are the channel status vectors of $2^M$.

In order to determine the optimal channel status vector and optimal bit rate which are capable of decreasing the channel zapping time and improving the video quality transmitted through the corresponding channel, as mentioned above, the controller 210 determines the optimal channel status vector enabling the cost to be at minimum, wherein the cost is defined by the sum of the average channel zapping time of the respective channels and the average distortion value of the video data transmitted through the respective channels; and determines the optimal bit rate it the determined optimal channel status vector.

$$a \cdot Z(\vec{s}, \vec{p}) + (1-a) \cdot D(r)$$ [Equation 2]

At this time, $Z(\vec{s}, \vec{p})$ denotes the average channel zapping time of the respective channels; D(r) denotes the average distortion value of the video data; and a denotes a weight which can be controlled by a network manager, wherein the weight is within a range between '0' and '1'. In one embodiment of the present invention, a is adjustable according to a subscriber's request. If the subscriber requires the short channel zapping time, the network manager may set the large value a (for example, a vale above a specific threshold value). In the meantime, if the subscriber requires the better video quality, the network manager may set the small value α (for example, a value below a specific threshold value).

In consideration for the limited network resource, the controller 210 may determine the optimal channel status vector and the optimal bit rate which enable the cost defined by the aforementioned equation 2 to be at minimum, and simultaneously satisfying the conditions of the following equations 3 and 4.

$$\left(\sum_{i=1}^{M_{ch}} s_i\right) \cdot r \leq BW_{pro} \quad \text{[Equation 3]}$$

$$\left(M_{ch} - \sum_{i=1}^{M_{ch}} s_i\right) \cdot r \leq BW_{on} \quad \text{[Equation 4]}$$

In equation 3, $BW_{pro}$ denotes the network bandwidth allocated to the first type channel; and $BW_{on}$ denotes the network bandwidth allocated to the second type channel.

The conditions of the aforementioned equation 3 means that the network resource required for the first type channels at a specific bit rate r must be the same as or less than the network bandwidth $BW_{pro}$ allocated to the first type channel. The conditions of the aforementioned equation 4 means that the network resource required for the second type channels at a specific bit rate r must be the same as or less than the network bandwidth $BW_{on}$ allocated to the second type channel.

In the meantime, the specific bit rate r can be calculated by the following equation 5.

$$r = \left\lfloor \frac{BW_{pro}}{n_{pro}} \right\rfloor, \quad \text{[Equation 5]}$$

In equation 5, $n_{pro}$ denotes the number of the first type channels; and $\lfloor x \rfloor$ denotes a maximum integer below 'x'. Accordingly, the maximum bit rate r max can be defined by the following equation 6; and the minimum bit rate r min can be defined by the following equation 7.

$$r_{max} = \left\lfloor \frac{BW_{pro}}{n_{pro}^{min}} \right\rfloor \quad \text{[Equation 6]}$$

$$r_{min} = \left\lfloor \frac{BW_{pro}}{n_{pro}^{max}} \right\rfloor \quad \text{[Equation 7]}$$

In equation 6, $n_{pro}^{max}$ denotes the maximum number of the first type channels; and $n_{pro}^{max}$ denotes the minimum number of the first type channels, which can be respectively defined by the following equations 8 and 9.

$$n_{pro}^{max} = M_{ch} \quad \text{[Equation 8]}$$

$$n_{pro}^{min} = \arg\min_{1 \leq k \leq M_{ch}} P(k) \quad \text{[Equation 9]}$$

At this time, $M_{ch}$ of the equation 8 denotes the total channel number; and P(k) of the equation 9 is defined by the following equation 10.

$$P(k) = \begin{cases} BW_{residue}(k) & \text{if } BW_{residue}(k) > 0, \\ \infty & \text{otherwise,} \end{cases} \quad \text{[Equation 10]}$$

At this time, $BW_{residue}(k)$ of the equation 10 can be defined by the following equation 11.

$$BW_{residue}(k) = BW_{on} - \left(\left\lfloor \frac{BW_{pro}}{k} \right\rfloor \cdot \min\{N_{subs}, (M_{ch} - k)\}\right) \quad \text{[Equation 11]}$$

In the meantime, $Z(\vec{s}, \vec{p})$ and D(r) of equation 2 may be obtained by normalizing the virtual average channel zapping time of the respective channels and the virtual average distortion value in a specific range, for example, [0, 1]. This is because $Z(\vec{s}, \vec{p})$ and D(r) are the values having the different dimensions. At this time, $Z(\vec{s}, \vec{p})$ and D(r) can be calculated by the following equation 12.

$$Z(\vec{s}, \vec{p}) = \frac{z_{avg}(\vec{s}, \vec{p}) - z_{avg}^{min}}{z_{avg}^{max} - z_{avg}^{min}} \quad \text{[Equation 12]}$$

In equation 12, $z_{avg}(\vec{s}, \vec{p})$ denotes the virtual average channel zapping time of the respective channels, which can be calculated by the following equation 13.

$$z_{avg}(\vec{s}, \vec{p}) = t_{pro}\sum_{i=1}^{M_{ch}} s_i p_i + t_{pro}\sum_{i=1}^{M_{ch}} (1 - s_i)p_i^2 + t_{on}\sum_{i=1}^{M_{ch}} (1 - s_i)p_i(1 - p_i) \quad \text{[Equation 13]}$$

$$= t_{pro}\left(1 - \sum_{i=1}^{M_{ch}} (1 - s_i)p_i(1 - p_i)\right) + t_{on}\sum_{i=1}^{M_{ch}} (1 - s_i)p_i(1 - p_i)$$

In equation 13, $t_{pro}$ denotes the channel zapping time of the first type channel; and $t_{on}$ denotes the channel zapping time of the second type channel, which can be defined by the following equation 14 and 15, respectively.

$$t_{pro} = \frac{T_{dec}}{2} \quad \text{[Equation 14]}$$

$$t_{on} = T_{net} + \frac{T_{dec}}{2} \quad \text{[Equation 15]}$$

In equations 14 and 15, $T_{dec}$ denotes time interval of GOP (Group of Picture) of the video data; and $T_{net}$ denotes a network delay time including a passing time and a processing time, wherein the passing time indicates a time period needed to receive the requested channel after transmitting the request for changing the channel, and the processing time indicates a time period needed for multicast session join and level processes.

In equation 13, $p_i$ denotes a preference for the $i^{th}$ channel. The preference for all channels may be expressed by using a channel preference vector shown in the following equation 16.

$$\vec{p} = (p_1, p_2, \ldots, p_{M_{ch}}) \qquad \text{[Equation 16]}$$

In the meantime, $p_i$ may be approximated by the following equation 17, wherein the sum of preferences for the respective channels becomes '1'.

$$p_i \approx \frac{\sum_{j=1}^{N_{subs}} tw_i^j}{N_{subs} \cdot T_{update}} \qquad \text{[Equation 17]}$$

In equation 17, $T_{update}$ is a fixed time interval; and $tw_i^j$ is a time interval that the $j^{th}$ subscriber has watched the $i^{th}$ channel.

In equation 12, $z_{avg}^{min}$ denotes the average channel zapping time of the respective channels when the number of the first type channels is $n_{pro}^{max}$ minimum; and $z_{avg}^{max}$ denotes the average channel zapping time of the respective channels when the number of the first type channels is $n_{pro}^{min}$ at minimum.

In the meantime, the average distortion value of the video data shown in the aforementioned equation 2, D(r), may be calculated by the following equation 18.

$$D(r) = \frac{d_{avg}(r) - d_{avg}^{min}}{d_{avg}^{min} - d_{avg}^{max}} \qquad \text{[Equation 18]}$$

In equation 18, $d_{avg}(r)$ denotes the virtual average distortion value of the video data, which is calculated by the following equation 19. In equation 18, $d_{avg}^{min}$ denotes the average distortion value at the maximum bit rate $r_{max}$; and $d_{avg}^{max}$ denotes the average distortion value at the minimum bit rate $r_{min}$.

$$d_{avg}(r) = \frac{\sum_{i=1}^{M_{ch}} d_i}{M_{ch}} \qquad \text{[Equation 19]}$$

In equation 19, $d_i$ indicates an R-D (rate-distortion) curve proposed in a bit rate distortion model, wherein $d_i$ may be approximated by the following equation 20.

$$d_i \approx a_i \left( \frac{r}{f_i \cdot w_i} \right)^{-b_i} \qquad \text{[Equation 20]}$$

In equation 20, $a_i$ and $b_i$ are distortion model parameters of the $i^{th}$ channel; $f_i$ denotes the number of frames in the $i^{th}$ channel; and $w_i$ denotes the number of pixels per frame in the $i^{th}$ channel.

As mentioned above, a method of calculating the optimal channel status vector and the optimal bit rate in the controller 210 will be explained with reference to FIGS. 4 and 5.

Figure 1A:
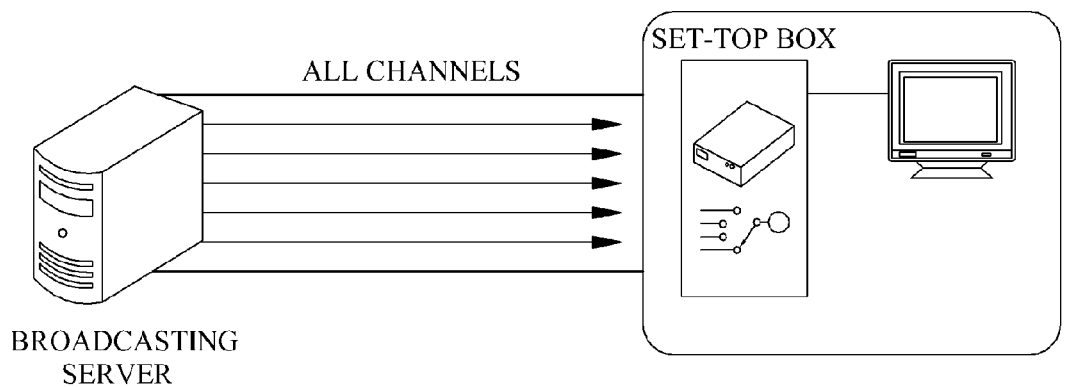
FIG. 1 illustrates a broadcasting service provision mechanism and an IPTV service providing mechanism.
Figure 1B:
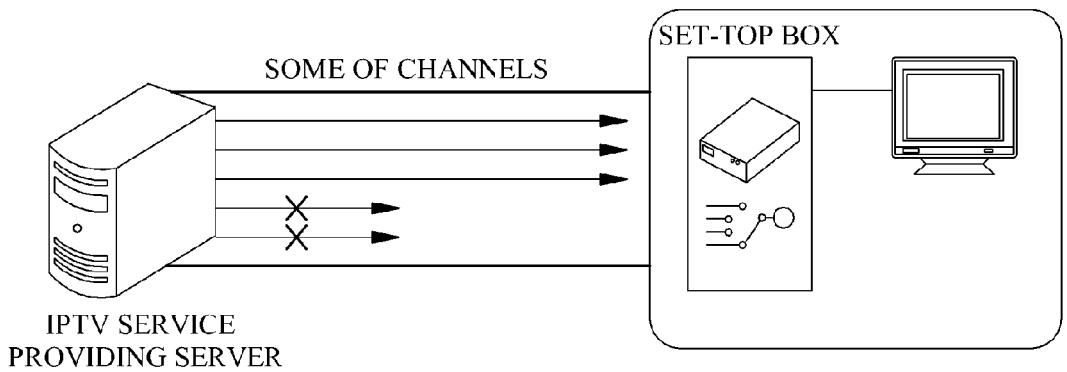

Referring once again to FIG. 1, the transmitter 220 transmits the video data at the optimal bit rate determined by the controller 210 to the user terminals through the respective channels. At this time, as mentioned above, if the corresponding channel is the first type channel, the transmitter 220 transmits the vide3 data to the user terminal without regard to the user's request. In the meantime, if the corresponding channel is the second type channel, the transmitter 220 transmits the video data to an IPTV, and then transmits the corresponding video data to the user terminal only when there is the user's request.

In one embodiment of the present invention, the aforementioned channel controlling apparatus 200 may be in communication with WiMAX so as to provide the IPTV service through the use of WiMAX network. In this case, the user may be provided with the IPTV service under the mobile environments. If the IPTV service is provided over the WiMAX network, the channel change request may be transmitted through the use of UGS (Unsolicited Grant Service) class, wherein GI (Grant Interval) of the UGS may be predetermined.

If the IPTV service is provided over the WiMAX network, the video data may be transmitted at the sparsest modulation and the lowest coding rate.

If the IPTV service is provided over the WiMAX network, only the channel zapping time of the second type channel is changed, that is, the explanation for the rest except the channel zapping time of the second type channel is the same as the aforementioned explanation.

If the IPTV service is provided over the WiMAX network, the channel zapping time of the second type channel may be defined by the following equation 21.

$$t_{on} = T_{net} + \frac{T_{dec} + GI}{2} \qquad \text{[Equation 21]}$$

In equation 21, the channel zapping time of the second type channel is determined in consideration for GI indicating the GI of the UGS class.

Hereinafter, a detailed structure of the controller 210 shown in FIG. 2 will be described with reference to FIGS. 4 and 5.

Figure 4:
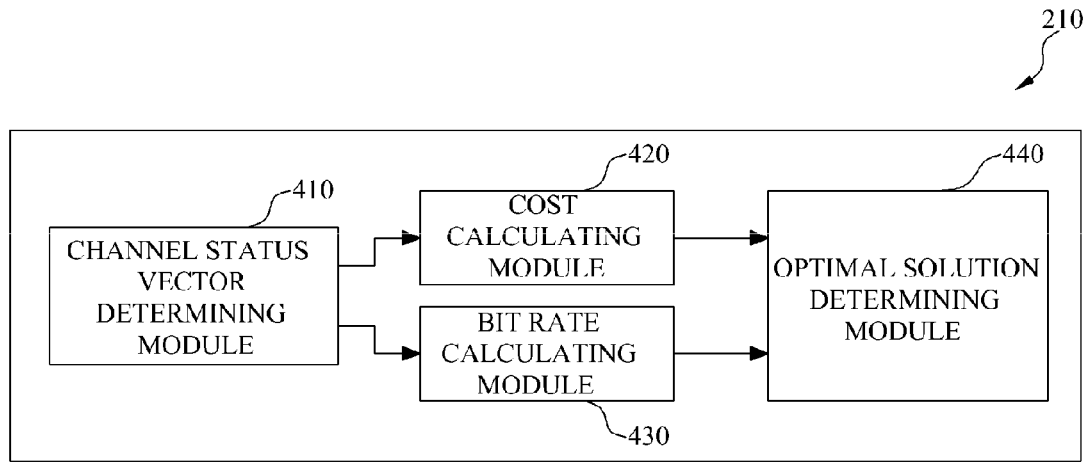
FIG. 4 illustrates a structure in the controller of FIG. 2.

FIG. 4 illustrates a detailed structure of the controller 210 according to the first embodiment of the present invention. As shown in FIG. 4, the controller 210 according to the first embodiment of the present invention includes a channel status vector determining module 410, a cost calculating module 420, a bit rate calculating module 430, and an optimal solution determining module 440.

First, the channel status vector determining module 410 changes the channel status vectors by changing the channel type of the respective channels until the number of the first type channels among the 'M' channels becomes the predetermined minimum value.

For example, the channel status vector determining module 410 determines a first channel status vector by setting all channels to the first type channel at an initial step. Then, one channel among the 'M' channels is changed to the second type channel, to thereby change the first channel status vector. After that, another channel is changed to the second channel type, whereby the changed channel status vector is changed again. These steps are repeated until the number of the first type channels becomes '3'. At this time, the channel in which user's preference is low is selected as one to be changed in channel type.

Next, the cost calculating module 420 calculates the cost which corresponds to the sum of the average channel zapping time of the respective channels and the average distortion value of video data to be transmitted through the respective channels at each channel status vector determined by the channel status vector determining module 410.

For example, when determining the first channel status vector by the channel status vector determining module 410, the cost is calculated at the first channel status vector. When the first channel status vector is changed by the channel status vector determining module 410, the cost is calculated at the changed channel status vector.

At this time, the cost is calculated by the aforementioned equation 2, whose detailed explanation will be omitted.

Then, the bit rate calculating module 430 calculates the bit rate of the respective channels per channel status vector determined by the channel status vector determining module 410. In one embodiment of the present invention, the bit rate calculating module 430 can calculate the bit rate of the respective channels through the use of the aforementioned equation 5.

For example, when the first channel status vector is determined by the channel status vector determining module 410, the bit rate is calculated by using the number of the first type channels at the first channel status vector. Then, when the first channel status vector is changed by the channel status vector determining module 410, the bit rate is calculated by using the number of the first type channels at the changed channel status vector.

Next, the optimal solution determining module 440 selects the channel status vector, which enables the cost calculated by the cost calculating module 420 to be at minimum, among the channel status vectors; determines the selected channel status vector as the optimal channel status vector; and determined the optimal bit rate at the optimal channel status vector.

A method of determining the optimal channel status vector and the optimal bit rate in the controller 210 will be explained as follows.

First, when the channel status vector determining module 410 determines the first channel status vector where all channels are set to the first type channels, the cost calculating module 420 and the bit rate calculating module 430 respectively calculate a first cost and a first bit rate at the first channel status vector.

Since the number of the first type channels is not at minimum, the channel status vector determining module 410 changes at least one channel of the 'M' channels to the second type channel, to thereby change the first channel status vector. The cost calculating module 420 and the bit rate calculating module 430 respectively calculate a second cost and a second bit rate at the changed channel status vector.

Then, the optimal solution calculating module 440 compares the first cost with the second cost. Based on the comparison result, if the second cost is less than the first cost, the optimal solution calculating module 440 determines the second bit rate and the channel status vector changed at the minimum number of the first type channels as optimal solutions.

If the number of the first type channels is not at minimum, the optimal solution calculating module 440 notifies the result to the channel status vector determining module 410, and thus the channel status vector determining module 410 changes the channel type of at least one channel, whereby the changed channel status vector is changed again.

That is, the optimal solution calculating module 440 selects the channel status vector with the minimum cost from the costs calculated per channel statue vector; determines the selected channel status vector as the optimal channel status vector; and determines the bit rate at the optimal status vector as the optimal bit rate.

In the aforementioned first embodiment of the present invention, the controller 210 calculates the cost for each of all channel statue vectors; determines the channel status vector with the minimum cost as the optimal channel status vector; and determines the optimal bit rate at the optimal channel status vector. However, a second embodiment of the present invention discloses that the optimal channel status vector and the optimal bit rate are determined by a bisection method so as to reduce complexity of calculation.

A detailed structure of the controller according to the second embodiment of the present invention will be explained with reference to FIG. 5. FIG. 5 illustrates a detailed structure of the controller 210 according to the second embodiment of the present invention.

Figure 5:
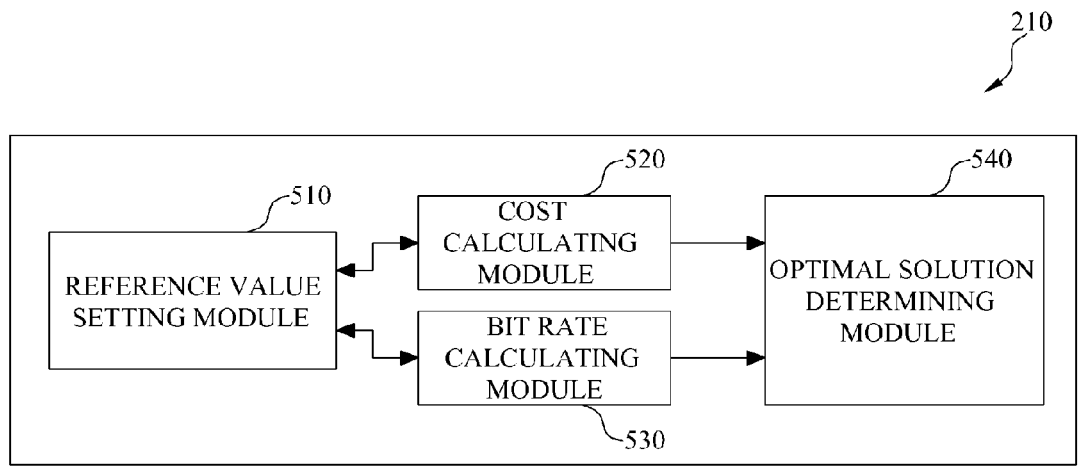
FIG. 5 illustrates another structure in the controller of FIG. 2.

As shown in FIG. 5, the controller 210 according to the second embodiment of the present invention includes a reference value setting module 510, a cost calculating module 520, a bit rate calculating module 530, and an optimal solution determining module 540.

First, the reference value setting module 510 determines a first reference value and a second reference value by using the number of first type channels among 'M' channels. In one embodiment of the present invention, the first reference value is initially determined by the minimum number of the first type channels; and the second reference value is initially determined by the maximum number of the first type channels.

Based on the result of the optimal solution determining module 540 to be explained, the reference value setting module 510 resets the first and second reference values.

Then, the cost calculating module 520 calculates a cost, wherein the cost corresponds to the sum of an average channel zapping time of the respective channels and an average distortion value of video data to be transmitted through the respective channels at each channel status vector determined based on an intermediate value between the first and second reference values, a maximum value among integers below the intermediate value, and a minimum value among integers above the intermediate value.

At this time, the intermediate value between the first and second reference values may be a maximum value among integers below an average value of the first and second reference values.

That is, the cost calculating module 520 calculates a cost for the minimum value, a cost for the intermediate value, and a cost for the maximum value. At this time, the cost can be calculated by the aforementioned equation 2.

Next, the bit rate calculating module 530 calculates a bit rate of video data to be transmitted through the respective channels, wherein the bit rate is calculated for the intermediate value between the first and second reference values, the maximum value among the integers below the intermediate value, and the minimum value among the integers above the intermediate value. At this time, the bit rate calculating module 530 can calculate the bit rate by the aforementioned equation 5.

If the cost for the intermediate value is the same as or less than the cost for the minimum value and the cost for the maximum value, the optimal solution determining module 540 determines the channel status vector and bit rate for the intermediate value as the optimal channel status vector and optimal bit rate.

In the meantime, if the cost for the minimum value is less than the cost for the maximum value, or the cost for the minimum value is the same as or more than the cost for the maximum value, the optimal solution determining module 540 notifies the result to the reference value setting module 510, and thus the reference value setting module 510 substitutes the intermediate value for the initially-set first or second reference value.

A method of determining the optimal channel status vector and optimal bit rate in the controller 210 according to the second embodiment of the present invention will be explained as follows.

First, the reference value setting module 510 sets the first and second reference values, wherein the first reference value is set to the minimum number of the first type channels, and the second reference value is set to the maximum number of the first type channels.

Based on the intermediate value between the first and second reference values, the maximum value among the integers below the intermediate value, and the minimum value among the integers above the intermediate value, the cost calculating module 520 calculates the cost for the intermediate value, the cost for the maximum value, and the cost for the minimum value.

Also, the bit rate calculating module 530 calculates the bit rate for the intermediate value, the bit rate for the maximum value, and the bit rate for the minimum value.

If the bit rate for the intermediate value is the same as or less than the bit rate for the maximum value, and is the same as or less than the bit rate for the minimum value, the optimal solution determining module 540 determines the channel status vector and bit rate for the intermediate value as the optimal channel status vector and optimal bit rate.

In the meantime, if the bit rate for the minimum value is less than the bit rate for the maximum value, or the bit rate for the minimum value is the same as or more than the bit rate for the maximum value, the optimal solution determining module 540 notifies the result to the reference value setting module 510. Also, if the bit rate for the minimum value is less than the bit rate for the maximum value, the reference value setting module 510 substitutes the intermediate value for the second reference value. Meanwhile, if the bit rate for the minimum value is the same as or more than the bit rate for the maximum value, the reference value setting module 510 substitutes the intermediate value for the first reference value.

A channel controlling method according to the present invention will be described with reference to FIGS. 6 to 8.

Figure 6:
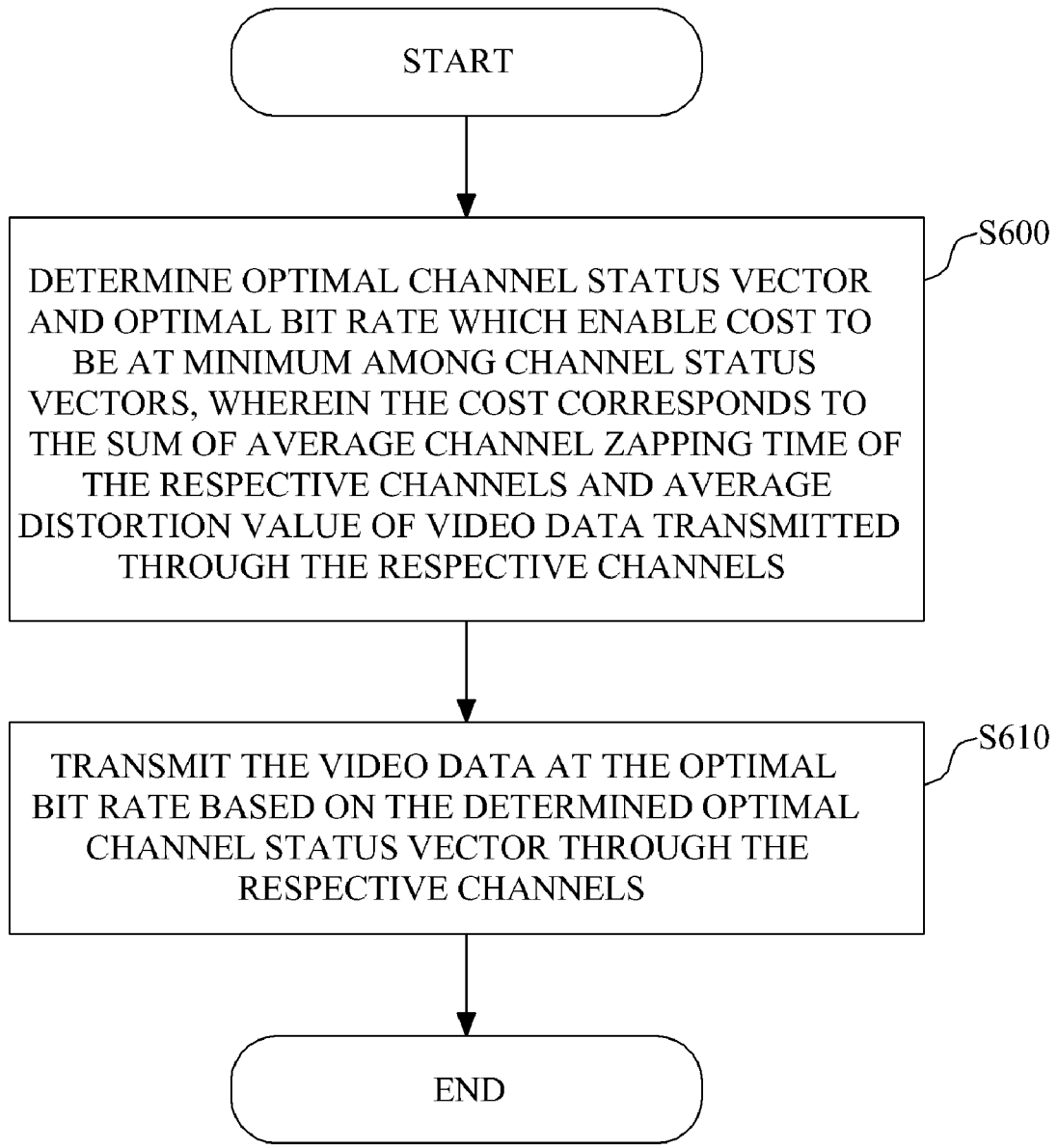
FIG. 6 is a flowchart illustrating a channel controlling method according to one embodiment of the present invention.

FIG. 6 is a flow chart illustrating a channel controlling method according to one embodiment of the present invention.

Among the channel status vectors to indicate the channel type of the respective channels, the optimal channel status vector and optimal bit rate are determined by using the channel status vector which enables the cost to be at minimum in step of 600, wherein the cost is defined by the sum of the average channel zapping time of the respective channels and the average distortion value of the video data transmitted through the respective channels.

Based on the determined optimal channel status vector, the video data is transmitted at the optimal bit rate through each of the respective channels in step of S610. At this time, in case of the first type channel, the video data is transmitted to the user terminal without regard to the user's request. In the meantime, in case of the second type channel, the video data is transmitted to the user terminal only when there is the user's request.

A method of determining the optimal channel status vector and optimal bit rate which enable the cost to be at minimum will be described with reference to FIGS. 7 and 8.

Figure 7:
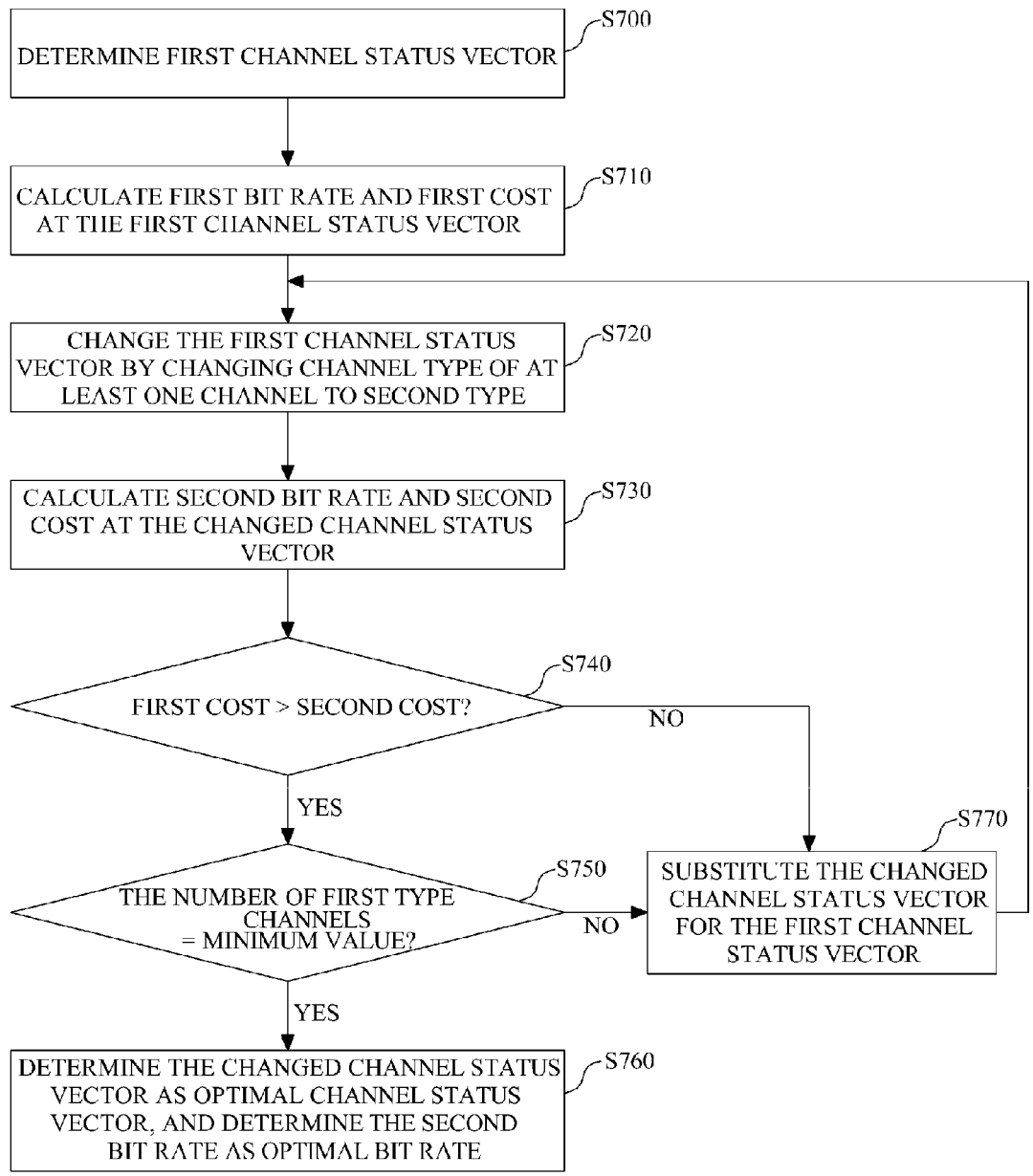
FIG. 7 is a flowchart illustrating a detailed method of determining an optimal solution according to one embodiment of the present invention.

Referring to FIG. 7, the first channel status vector is set such that all of the 'M' channels have the first type in step of S700.

Then, the first bit rate and first cost are calculated at the first channel status vector in step of S710. The first bit rate can be calculated by the aforementioned equation 5, and the first cost can be calculated by the aforementioned equation 2.

Among the 'M' channels, the channel type of at least one channel is changed to the second type, and thus the first channel status vector is changed in step of S720. In this case, the first channel status vector may be changed by changing the channel type of the channel in which user's preference is low.

After that, the second bit rate and second cost are calculated at the changed channel status vector in step of S730.

Then, the first cost is compared with the second cost in step of S740. Based on the comparison result, if the second cost is less than the first cost, it is determined whether or not the number of the first type channels is the predetermined minimum number in step of S750. If the number of the first type channels is the predetermined minimum number, the changed channel status vector and second bit rate are determined as the optimal channel status vector and optimal bit rate in step of S760.

Based on the determination result of S750, if the number of the first type channels is not the predetermined minimum number, the changed channel status vector substitutes for the first channel status vector in step of S770, and then the steps of S720 to S770 are performed repetitively.

The aforementioned embodiment discloses that the costs for all of the channel status vectors are calculated. In a modified embodiment of the present invention, the costs for some of the channel status vectors are calculated so as to determine the optimal channel status vector and optimal bit rate.

Figure 8:
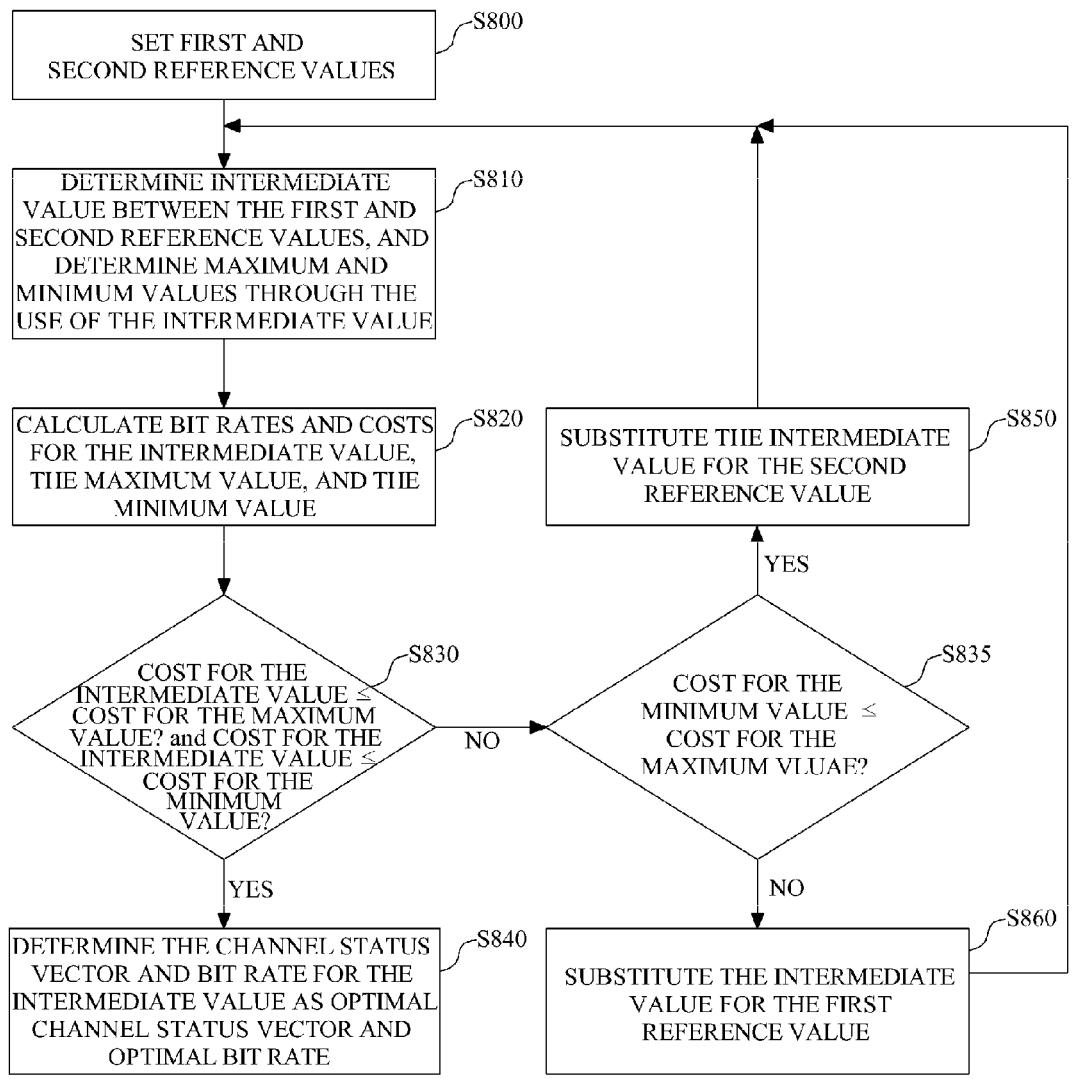
FIG. 8 is a flowchart illustrating a detailed method of determining an optimal solution according to another embodiment of the present invention.

Referring to FIG. 8, the first reference value is set by using the minimum number of the first type channels among the 'M' channels, and the second reference value is set by using the maximum number of the first type channels in step of S800.

Then, the intermediate value between the first and second reference values, the maximum value among the integers below the intermediate value, and the minimum value among the integers above the intermediate value are determined in step of S810. At this time, the intermediate value denotes the maximum value among the integers below the average value of the first and second reference values.

Based on the intermediate value, the maximum value, and the minimum value, the cost and bit rate for the intermediate value, the cost and bit rate for the maximum value, and the cost and bit rate for the minimum value are determined in step of S820. At this time, the cost can be calculated by the aforementioned equation 2, and the bit rate can be calculated by the aforementioned equation 5.

Then, it is determined whether or not the cost for the intermediate value is the same as or less than the cost for the maximum value and the cost for the minimum value in step of S830. If the cost for the intermediate value is the same as or less than the cost for the maximum value and the cost for the minimum value, the channel status vector determined based on the intermediate value is determined as the optimal channel status vector, and the bit rate for the intermediate value is determined as the optimal bit rate in step of S840.

According to the result of S830, it is determined whether or not the cost for the minimum value is less than the cost for the maximum value in step of S835. If the cost for the minimum value is less than the cost for the maximum value, the intermediate value substitutes for the second reference value in step of S850, and then the aforementioned steps of S810 to S840 are performed repetitively. If the cost for the minimum value is the same as or more than the cost for the maximum value, the intermediate value substitutes for the first reference value in step of 860, and then the aforementioned steps of S810 to S840 are performed repetitively.

The aforementioned channel controlling method according to the present invention can be implemented in type of program command executed by various computers, and can be stored on computer-readable record media, for example, program command, data file, and data structure, singly or conjointly. The program command stored on the computer-readable record media may be especially designed for the present invention, or may be widely used by those skilled in the field of computer software.

The computer-readable record media may include a hardware apparatus especially designed to store and execute the program command, for example, magnetic media such as hard disk, floppy disk and magnetic tape; optical media such as CD-ROM and DVD; magneto-optical media such as floptical disk; ROM; RAM; flash memory, and etc. In the meantime, the record media may be an optical wire, a metal wire, or a waveguide including carrier wave to transmit a signal for designating the program command and data structure.

Also, the program command may include a high-level language code to be executed by the computer through the use of interpreter as well as a machine language code made by a compiler. In order to execute this operation, the aforementioned hardware apparatus may be operated as one or more software module, or the contrary case is also in the same manner.

Accordingly, the method and apparatus for controlling the channel for providing the IPTV service according to the present invention has the following advantages.

The control for the channel type of the respective channels and the bit rate of the video data to be transmitted through the respective channels prevents the waste of network resource, and also reduces the channel zapping time.

Also, the user's preference for each channel is considered when determining the channel type and the bit rate of the video data. Thus, the channel with the high user's preference is selected as one to be transmitted to the user terminal even though there is no user's request, whereby it is possible to minimize the channel zapping time and to prevent the waste of network resource.

Also, the new algorithm is applied when determining the channel type and the bit rate, thereby reducing the complexity of calculation.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of controlling a channel for providing an IPTV service comprising:
   determining first and second reference values by using the number of first type channels among 'M' channels, and determining an intermediate value between the first and second reference values;
   calculating a maximum value among integers below the intermediate value, and a minimum value among integers above the intermediate value, and determining a bit rate of video data to be transmitted through the respective channels based on the minimum value, the intermediate value, and the maximum value;
   calculating a cost at each channel status vector determined based on the minimum value, the intermediate value, and the maximum value, wherein the cost corresponds to the sum of an average channel zapping time of the respective channels and an average distortion value of video data to be transmitted through the respective channels; and
   determining the channel status vector and bit rate for the intermediate value as an optimal channel status vector and optimal bit rate if the cost for the intermediate value is the same as or less than the cost for the minimum value and the cost for the maximum value, and repeating each step after substituting the intermediate value for the first or second reference value if the cost for the minimum value is less than the cost for the maximum value or the cost for the minimum value is the same as or more than the cost for the maximum value,
   wherein the average channel zapping time of the respective channels is a value obtained by normalizing a virtual average channel zapping time of the respective channels at the specific channel status vector in a predetermined range,
   wherein the virtual average channel zapping time of the respective channels at the specific channel status vector is determined by a channel zapping time for the first type channel, a channel preference for each channel, information about the channel type of each channel, and a channel zapping time for the second type channel,
   wherein the virtual average channel zapping time of the respective channel at the specific channel status vector is calculated by $$t_{pro}\left(1 - \sum_{i=1}^{M_{ch}} (1-s_i)p_i(1-p_i)\right) + t_{on}\sum_{i=1}^{M_{ch}} (1-s_i)p_i(1-p_i),$$

wherein $t_{pro}$ is the channel zapping time for the first type channel; $S_i$ is the information for the channel type of the $i^{th}$ channel; $p_i$ is the preference for the $i^{th}$ channel; $t_{on}$ is the channel zapping time for the second type channel; and $M_{ch}$ is the total channel number.

2. The method of claim 1, wherein the first reference value is the predetermined minimum number of the first type channels, and the second reference value is the predetermined maximum number of the first type channels.

3. The method of claim 1, wherein the channel types includes first and second types, wherein the first type transmits the video data to be transmitted through the respective channels to a user terminal without regard to a user's request, and the second type transmits the video data to the user terminal only when there is the user's request.

4. The method of claim 1, wherein the normalizing process is performed by dividing a difference between the virtual average channel zapping time at the specific channel status vector and the average channel zapping time when the number of the first type channels is at maximum by a difference between the average channel zapping time when the number of the first type channels is at minimum and the average channel zapping time when the number of the first type channels is at maximum.

5. The method of claim 1, wherein the information about the first type channel has a value of '1', and the information about the second type channel has a value of '0'.

6. The method of claim 1, wherein the channel zapping time for the first type channel is $$\frac{T_{dec}}{2},$$

and the channel zapping time for the second type channel is $$t_{on} = T_{net} + \frac{T_{dec}}{2},$$

wherein $T_{dec}$ is a time interval of GOP (Group of Picture) of the video data; and $T_{net}$ is the sum of a time period needed to receive the requested channel after transmitting the request for changing the channel, and a time period needed for multicast session join and level processes.

7. The method of claim 1, wherein the channel preference is approximated by $$\frac{\sum_{j=1}^{N_{subs}} tw_i^j}{N_{subs} \cdot T_{update}},$$

wherein $N_{subs}$ is the number of subscribers; $T_{update}$ is a fixed time interval; and $tw_i^j$ is a time interval that the $j^{th}$ subscriber has watched the $i^{th}$ channel.

8. The method of claim 1, wherein the bit rate is determined by the ratio of a bandwidth allocated to the first type channels to a total number of the first type channels at the specific channel status vector.

9. The method of claim 1, wherein the average distortion value of the video data to be transmitted through the respective channels is a value obtained by normalizing a virtual average distortion value in a predetermined range when the video data is transmitted at the specific bit rate through the respective channels.

10. The method of claim 1, wherein the normalizing process is performed by dividing a difference between the virtual average distortion value when the video data is transmitted at the specific bit rate and the virtual average distortion value when the video data is transmitted at the bit rate calculated under the conditions of the minimum number of the first type channels by a difference between the virtual average distortion value when the video data is transmitted at the bit rate calculated under the conditions of the maximum number of the first type channels and the virtual average distortion value when the video data is transmitted at the bit rate calculated under the conditions of the minimum number of the first type channels.

11. The method of claim 10, wherein the virtual average distortion value when transmitting the video data at the specific bit rate is defined by the ratio of a total value of R-D curve calculated by the respective channels and a total channel number 'M'.

12. The method of claim 11, wherein the R-D curve is approximated by $$a_i \left( \frac{r}{f_i \cdot w_i} \right)^{-b_i},$$

wherein $a_i$ and $b_i$ are distortion model parameters of the $i^{th}$ channel; $f_i$ is the number of frames in the $i^{th}$ channel; $w_i$ is the number of pixels per frame in the $i^{th}$ channel; and $r$ is the specific bit rate.

* * * * *